United States Patent [19]

Prudhomme et al.

[11] Patent Number: 4,742,849
[45] Date of Patent: May 10, 1988

[54] ANGLED PNEUMATIC CONNECTION INCLUDING MEANS FOR REGULATING A ONE-WAY FLOW

[75] Inventors: Pierre Prudhomme, St Germain En Laye; Jean-Luc Burban, Herblay; Michel Nicholas, Neauphle le Château, all of France

[73] Assignee: La Telemecanique Electrique, Nanterre, France

[21] Appl. No.: 41,393

[22] Filed: Apr. 23, 1987

[30] Foreign Application Priority Data

Apr. 24, 1986 [FR] France ............................ 86 05946

[51] Int. Cl.$^4$ ............................................. F16K 3/08
[52] U.S. Cl. ................................... 137/599.2; 91/443; 137/513.7; 137/625.31
[58] Field of Search ............ 91/443; 137/513.3, 513.7, 137/599.2, 625.31

[56] References Cited

U.S. PATENT DOCUMENTS 4,171,007 10/1979 Bouteille ...................... 137/513.7 X

FOREIGN PATENT DOCUMENTS 321048 3/1975 Austria .
1249619 9/1967 Fed. Rep. of Germany .
3215696 10/1983 Fed. Rep. of Germany ... 137/513.7
2343281 9/1977 France .

Primary Examiner—Gerald A. Michalsky
Attorney, Agent, or Firm—Sughrue, Mion, Zinn, Macpeak and Seas

[57] ABSTRACT

In an angled connection in accordance with the invention, the one-way flow of fluid at a restricted flow rate is provided in a direction opposite to direction F by co-operation between a wall (23) having fixed orifices and a plug (26) having moving openings (31). The area of overlap between the fixed orifices through the wall (23) and the moving openings (31) is adjustable by rotating the plug (26). Flow in the opposite direction, i.e. the direction of arrow F, is provided at full flow rate by openings (22) provided through the plug (26), which openings are closed by a non-return valve (37) which allows flow in said direction F. The plug (26) and the wall (23) are pressed together in sealed manner by a resilient member (33). The plug (26) is rotated by an outside ring (38) on the tubular portion (5) of the connection, said ring being coupled to the plug via a slot through the tubular portion (5), which slot is isolated in sealed manner from the path of fluid flow through the connection.

14 Claims, 4 Drawing Sheets

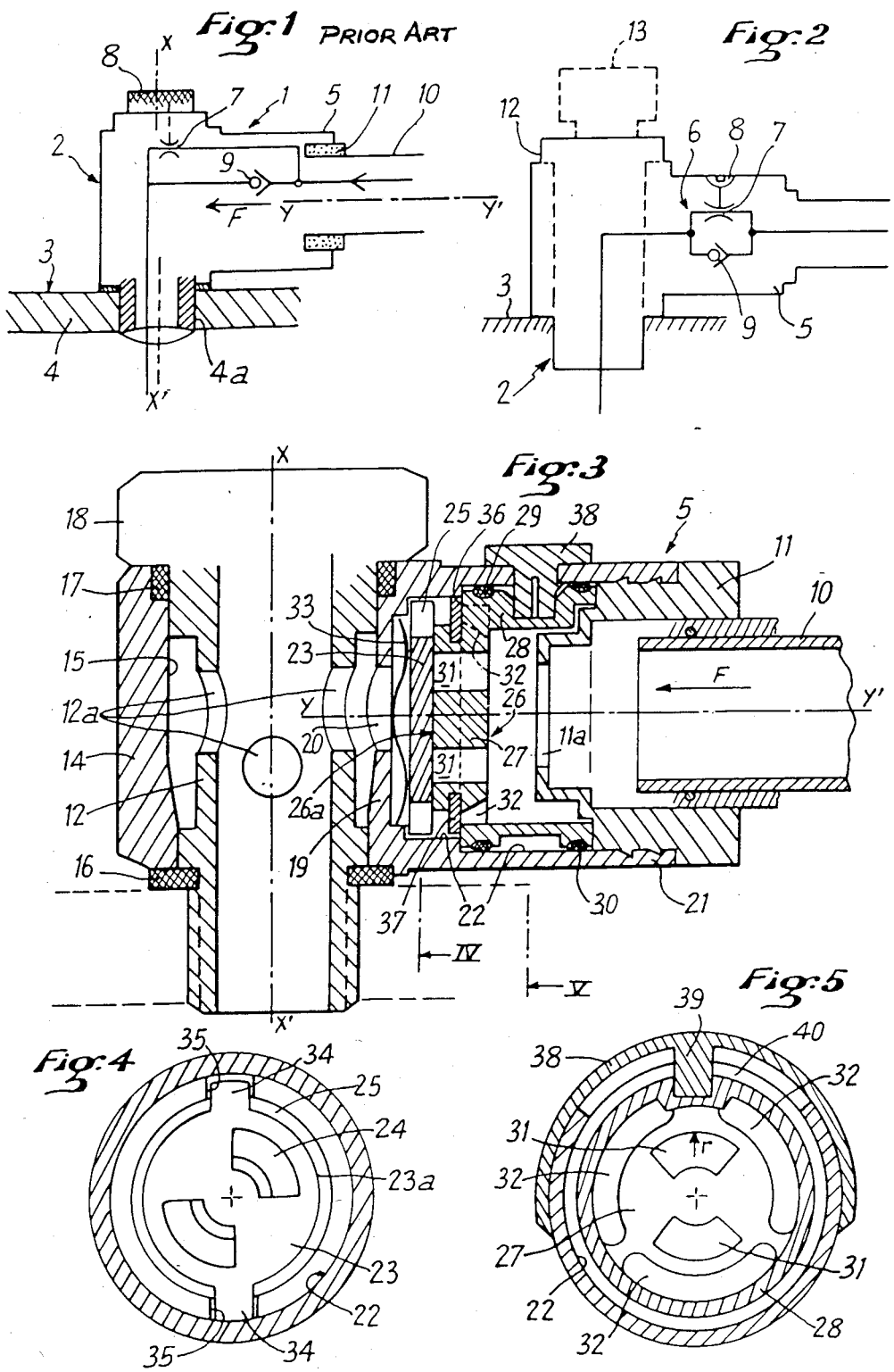

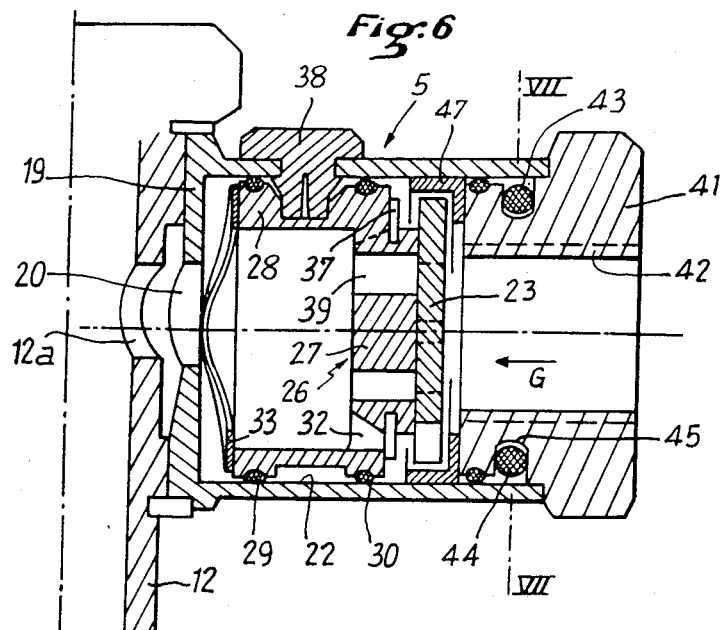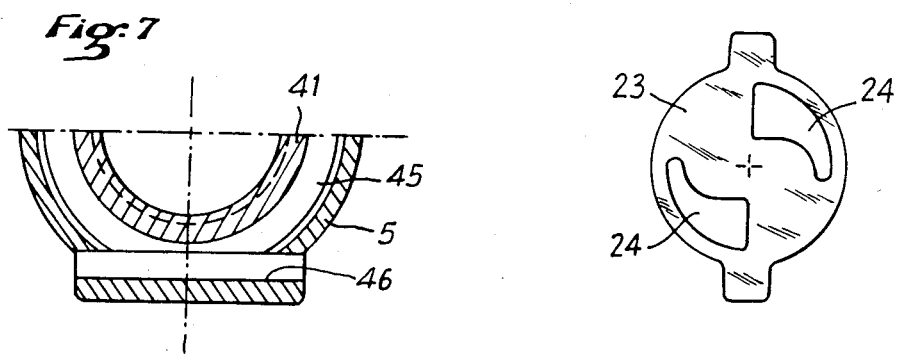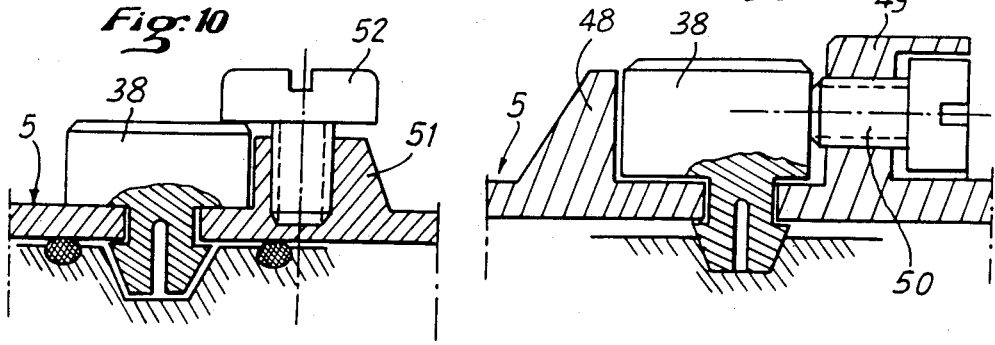

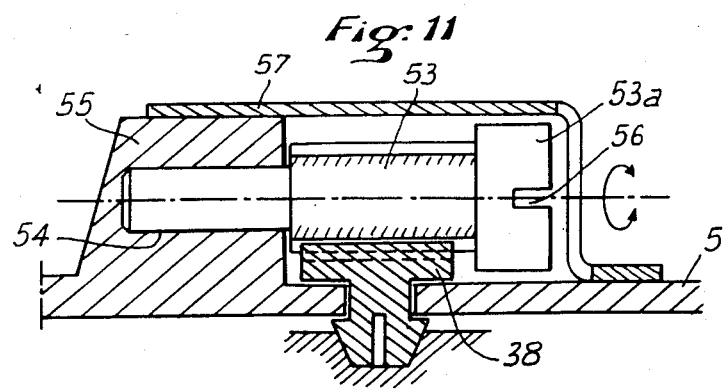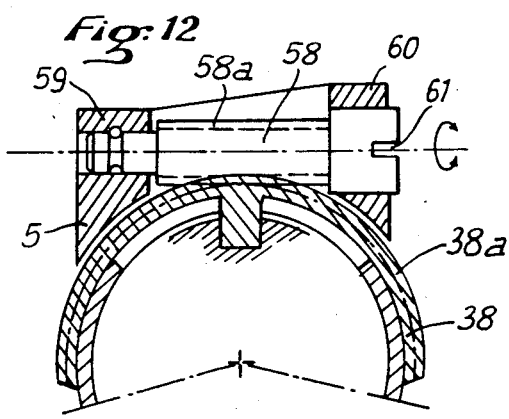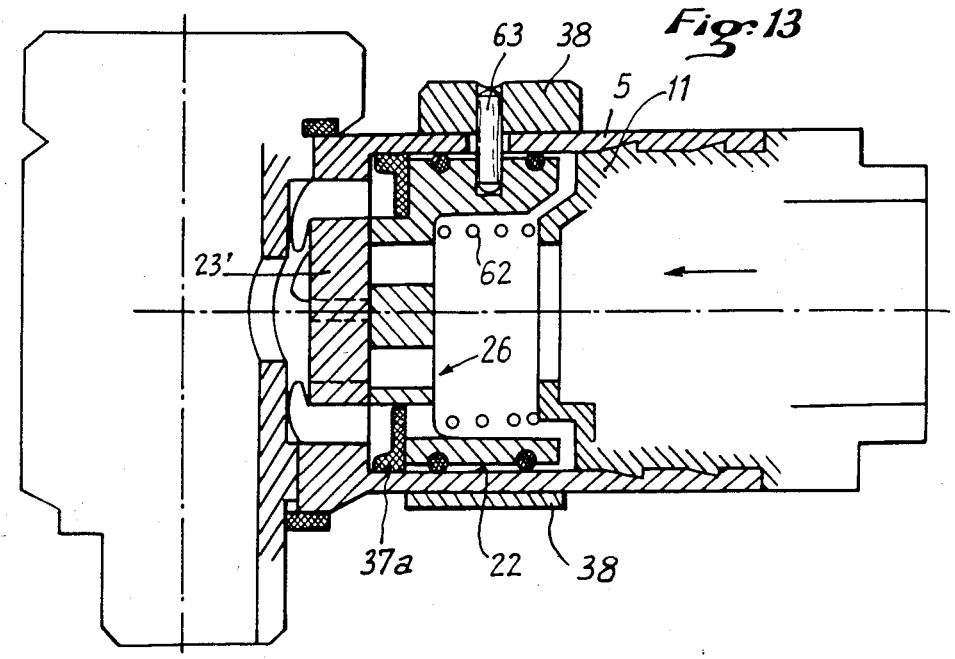

ANGLED PNEUMATIC CONNECTION INCLUDING MEANS FOR REGULATING A ONE-WAY FLOW

FIELD OF THE INVENTION

The invention relates to an angled connection for connecting a user apparatus to a pneumatic duct, the connection comprising a first tubular portion for fixing the connection to the apparatus in an opening provided through the wall thereof, and a second tubular portion perpendicular to the first and receiving said duct, said connection including internally both a passage of adjustable cross section for regulating the flow rate and a non-return valve circuit which is connected in parallel with said passage and which is disposed concentrically in a bore of the second portion.

BACKGROUND OF THE INVENTION

Such connections are intended in particular for feeding pneumatic actuators with fluid, and they suffer, in common with all flow rate regulating means having a passage of variable cross-section placed between an adjustable screw needle and an orifice, from the drawback of requiring a large number of turns to be performed in order to move the needle between its extreme positions. The screw pitch is chosen to be small enough to ensure that satisfactory sensitivity is obtained when adjusting small flow rates. In addition, the axial stroke given to such screws is directly influenced by the cone angle of the needle, and it is frequently observed that in the fully open position, the threaded shank of said screw or the knurled knob terminating it project a long way from the body in which they are mounted, and this can give rise to various operating problems and can give rise to misadjustments. In many cases, a considerable amount of manipulation is required before a satisfactory adjustment is found.

If the pitch of the needle screw thread is chosen to be large enough to reduce the number of turns that need to be made, the position of the screw is not stable, and it is essential to associate it with special locking means.

The invention seeks to provide a pneumatic connection whose general structure is as described above, but which also includes elements for mitigating the above-mentioned drawbacks.

SUMMARY OF THE INVENTION

The present invention provides an angled connection for connecting a pneumatic duct to a user apparatus, said connection comprising a first tubular fixing portion for fixing the connection to the apparatus by co-operating with an opening provided through a wall of the apparatus, and a second tubular portion perpendicular to the first and for receiving said duct, said connection including:

an internal passage for pneumatic fluid constituted by the inter-communicating bores of said two tubular portions, said passage being divided into first and second branches;

a constriction device of adjustable cross section being provided in said first branch;

a non-return valve being provided in said second branch;

the connection including the improvements whereby:

said second tubular portion includes an end plate at its end adjacent to said first tubular portion and duct retaining means at its opposite end for retaining said duct;

said two branches are located concentrically and in parallel inside the bore of said second tubular portion between said end plate and said duct retaining means;

said two branches are defined:

by means of a wall fixed in said bore and provided with first and second through orifices; and by means of a plug mounted free to rotate in sealed manner inside the bore about the bore axis y—y' and kept in contact one of the surfaces of said fixed wall through which said first orifices pass; said plug possessing:

at least one first through opening uncovering said first orifices to a greater or lesser extent depending on the angular position of the plug inside the bore in order to form said constriction of adjustable cross section; and at least one second through opening forming, together with said second orifices, said second internal branch of the passage;

a non-return valve co-operating with said second opening(s) and resiliently biased against a seat constituted by one of the surfaces of the plug into which the or each second opening opens out; and means accessible from outside said second tubular portion being coupled to said plug in order to rotate said plug in said bore.

Although flow-rate reducing devices are already known in which use is made of rotary plugs having moving openings cooperating with a part having a fixed opening, such devices are generally not associated in a small volume with means for preventing one-way fluid flow. Indeed, their use is practically totally limited either to controlling hydraulic fluids or else to coarse adjustment of a gaseous fluid flow such as may be required in air conditioning technology.

Various embodiments of the invention are possible. Thus, the contact surface between the plug and the wall may either be perpendicular to the axis of the bore or else it may be conical and coaxial with the bore, or else it may be cylindrical and coaxial therewith. In the first two cases the plug and the wall are held in contact against each other by resilient return means.

The wall may be integrally formed with the second tubular portion of the connection, or else it may be fitted into the bore of said second tubular portion and it may include means for preventing it from rotating relative thereto, with a resilient return member being connected between the bottom of the bore and said add-on wall.

It is advantageous to provide the plug with two annular sealing rings co-operating with the bore of the second tubular portion, which includes a slot between said sealing rings having operating and drive means passing therethrough for rotating the plug in the bore.

These operating means may be constituted by an external adjustment ring coaxial with the second tubular portion, said ring being axially and angularly coupled to the plug through the slot. Said means may also be constituted by a toothed wheel fixed axially on the second tubular portion and meshing via the slot with a toothed ring fixed on the plug. Finally, they may be constituted by a perpendicular screw fixed to the second tubular portion and co-operating with teeth on the plug in a worm-gear type of configuration, with the pitch of the meshing teeth being non-reversible so as to constitute means for locking the angular position of the plug.

Finally, the surface through which said second openings open out may either be radial, in which case the non-return valve is constituted by an annular resilient washer having one of its edges held fixed relative to said wall, or else it may be circularly symmetrical about the axis of the bore, in which case the non-return valve is constituted by a resilient sleeve of complementary shape having one of its ends held fixed relative to said wall.

BRIEF DESCRIPTION OF THE DRAWINGS

Embodiments of the invention are described by way of example with reference to the accompanying drawings, in which:

FIG. 1 is a diagram of a prior art two-portion angled pneumatic body;

FIG. 2 is a diagram showing, more accurately, the location where control and adjustment elements are disposed in the body in accordance with the invention;

FIG. 3 is an axial section through a first embodiment of the invention;

FIGS. 4 and 5 are cross-sections along lines IV—IV and V—V respectively of FIG. 3;

FIG. 6 shows a second embodiment of a connection in accordance with the invention in which the flow rate is controlled in the opposite direction of that shown in FIG. 3;

FIG. 7 is a half-section on a line VII—VII of FIG. 6 showing how a link stopper is mounted in a connection duct in accordance with the invention;

FIG. 8 is a front view of the perforated wall cooperating with the plug in accordance with the invention;

FIGS. 9 and 10 are fragmentary views of two examples of means for locking the flow rate adjustment member;

FIGS. 11 and 12 are fragmentary sections showing two variants of means of rotating the plug;

FIG. 13 is a section view through a variant of the FIG. 3 embodiment in which the perforated wall is integrally formed with the second tubular portion of the connection.

MORE DETAILED DESCRIPTION

Figure 14:
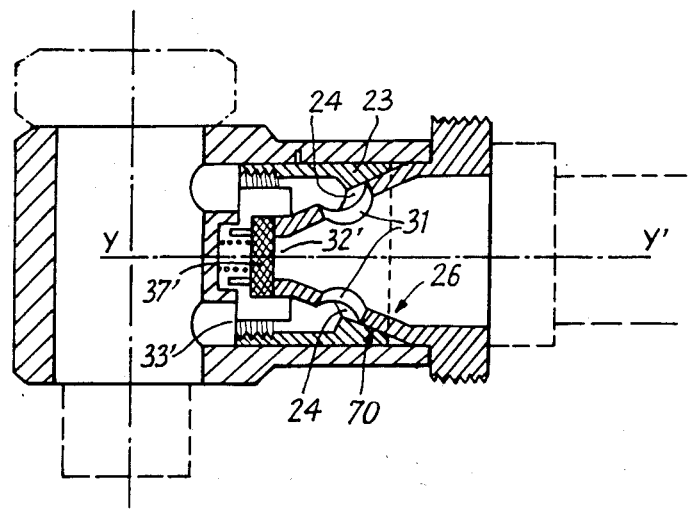
FIGS. 14 and 15 are diagrammatic sectional views of other embodiments of the device in accordance with the invention in which the plug is shaped like a rotary faucet cock.

The prior art angled pneumatic connection 1 shown in FIG. 1 comprises a first portion 2 about an axis x—x' perpendicular to the surface 3 of a wall 4 of a user apparatus. This first portion 2 is fixed to said wall, for example by being screwed into an opening 4a therethrough, and a fluid may flow through said opening. A second portion 5 of the connection runs along an axis y—y' perpendicular to the axis x—x' and is connected to a pneumatic duct 10 by means of an appropriate supporting stopper 11.

In this connection, one-way fluid flow adjusting means are constituted firstly by a passage or throttle 7 of variable cross section whose dimensions may be adjusted by means of an adjusting member 8 which is accessible from the outside, and secondly by a non-return valve 9 placed in parallel with the passage 7 and allowing a fluid arriving via the duct 10 to flow freely in one direction only, e.g. in the direction F. For fluid flow in the opposite direction, the valve 9 closes and flow takes place through the adjustable throttle 7.

Regardless of whether the adjustment takes place in the portion 2 or in the other portion 5, in order to adjust the size of the fluid-passing passage, said passage suffers from the above-mentioned drawbacks if it is adjusted by means of a screw having a fine pitch thread.

In the diagram of FIG. 2, it can be seen that the throttle means 7 and the non-return valve means 9 constitute a sub-assembly 6 which is associated with the second portion 5 of the connection. The adjustable means 8 is therefore also associated with said portion.

This disposition is preferable, in particular when the portion 2 also has the function of fixing the connection firmly and in a determinable direction on the surface 3 by means of a special through fixing part 12 in addition to its function of transmitting the fluid. It is also known, in such a disposition, to use said part 12 either to perform other functions in the connection, or else to receive other auxiliary devices such as the device 13 shown in dashed lines.

As can be seen more clearly in FIG. 3, the portion 5 of the connection includes a collar band 14 whose bore 15 about the axis x—x' has the hollow fixing bolt passing therethrough which constitutes the first portion 12 of the connection and which includes side openings 12a for communication between its inside volume and the bore 15 of the collar band 14. The required sealing is provided by sealing gaskets such as 16 and 17 which are compressed when the head 18 of said part 12 is screwed tight.

At the junction between the collar band 14 and the tubular portion about the axis y—y' of the part 5, there is an end plate 19 of the internal bore 22 coaxial with the axis y—y', and the end plate 19 has a hole 20 for communicating with the bore 15 of the collar band 14, and thus for communicating with the openings 12a. The opposite end 21 of the bore 22 from its end plate 19 receives a retaining stopper 11 suitable for fixing to the duct 10. Between the stopper 11 and the end plate 19 there exists a bore volume which contains the abovedescribed means 7 and 9.

In this embodiment and as shown in FIGS. 4 and 5, it can be seen that these means are constituted firstly by a wall 23 extending parallel to the end plate 19 and having a first series of orifices 24 and a second series of orifices 25 passing therethrougn, delimited in this case between the bore 22 and the outside edge 23a of the wall 23. These means also include a plug 26 having a transverse partition 27 extending axially in the form of a sleeve 28 enabling the plug 26 to bear against the inside surface of the bore 22. Contact sealing is provided between the plug and said surface by means of sealing rings 29 and 30. The transverse wall 27 of the plug includes a first series of through openings 31 extending parallel to the axis y—y', and a second series of through openings 32 which are radially offset relative to the openings 31. The leading front surface 26a of the wall 27 rests against one of the faces of the wall 23. Mutual abutment between the plug and the wall 23 is ensured by a resilient member 33, e.g. a spring washer, such that good sealing is provided at this contact. It may be observed in this respect that the wall 23 is added to the bore 22 and is held against rotation inside the tubular portion 5 of the connection by outwardly projecting diametrically opposite lugs 34 which co-operate with corresponding notches 35 provided in the bore. The openings 32 open out through a front surface 36 of the plug 26 which is situated at a small axial offset from said leading front surface 26a, with the surface 36 forming the seat of a non-return valve 37 which is constituted in this case by a resiliently deformable washer whose inside edge is retained in the wall 27. The plug 26 is coupled via its sleeve 26 to operating means for rotating it inside the bore 22. The operating means is constituted by a ring 38 having a radial projection 39 passing through a slot 40 provided through the portion 5 and received in a recess in the sleeve 28 of the plug 26 located between a pair of sealing rings 29 and 30.

By acting on the ring 38 to vary the angular position of the plug 26 inside the bore 22, the orifices 31 are displaced to a greater or lesser extent relative to the orifices 24 through the wall 23. This serves to adjust the fluid-passing area through the orifices 24 and 31. When fluid coming from the duct 10 reaches the bore 22 via the opening 11a through the stopper 11, it passes through the plug 26 mainly via the openings 32, by raising the non-return valve 37. The fluid can then flow through the openings 25 provided between the wall 23 and the bore 22 in order to reach the orifice 20, the orifices 12a, and finally reach the user apparatus. In this flow direction F, a portion of the fluid naturally flows through the orifices 31 and 24 if they should be overlapping.

In the opposite fluid flow direction to direction F, the fluid reaches the bore 22 via the orifice 20 and can only flow via the orifices 24 and 31 whose degree of overlap defines the area of the fluid-passing passage, since the non-return valved 37 prevents any fluid flow through the orifices 32.

It may be observed, in particular with reference to FIG. 5, that the ring 38 is substantially semi-circular only. Its angular extent needs to be sufficient to ensure that regardless of its position it always covers the slot 40. It may also be observed that the ring 38 constitutes the member 8 for adjusting the fluid-passing area as shown diagrammatically in FIG. 2.

It may be observed in FIG. 5 that the openings 31 through the plug are in the form of two sectors each extending over about 90°, with the sectors being symmetrically disposed about the axis of the plug and extending radially through an extent r such that there remains room between said radius and the maximum diameter of the plug to provide the openings 32 through the wall 27. The orifices 24 through the wall 23 are disposed on the same average radius as the average radius of the openings 31.

FIG. 6 shows a variant of the FIG. 3 embodiment in which the positions of the plug 26 and the wall 23 are interchanged. The direction of fluid flow G on which the flow rate restriction operates is also the other way round in this figure. In addition to the items already described with reference to FIG. 3, and shown in FIG. 6 with the same references, it may be observed that the retaining stopper 41 is of the type having an inside thread 42 for connection with corresponding end fittings or rigid threaded ducts. It is held axially in place in the bore 22 by means of pins 43 and 44 passing through the wall of said bore and received in a circular groove 45 on the stopper. FIG. 7 is a half-section on line VII—VII of FIG. 6 and shows the shape of the bore wall for delimiting a pin-receiving recess 46.

It can also be seen on FIG. 6 that the wall 23 is prevented from rotating in the bore 22 by a ring 47 which is a force fit in said bore and which includes the notches 35 shown in FIG. 4, said ring also serving to prevent any rotation of the stopper 41 from being transmitted to the wall 23 placed in the vicinity thereof. Naturally, a stopper such as 41 could also be mounted on the device shown in FIG. 3.

Finally, it may be observed that the spring 33 disposed in the vicinity of the end plate 19 of the bore 22 must, in the FIG. 6 case as in the FIG. 3 case, overcome the axial friction of the sealing rings 29 and 30 so as to press the plug 26 against the wall 23 in sealed manner. If such sealing is difficult to obtain, the spring may advantageously be placed between the wall 23 and the stopper 41 or the ring 47.

FIG. 8 shows specially shaped orifices 24 provided through the wall 23 for ensuring constant adjustment sensitivity when the plug is rotated. The same design could be applied to the openings 31 of the plug 26.

FIG. 9 is a fragmentary view showing that the second tubular portion of the connection may include two annular flanges 48 and 49 between which the ring 38 may be received, with the flange 49 having a lock screw 50 passing therethrough such that when it is screwed into place it prevents the ring 38 from moving between the screw and the flange 48.

A variant of these locking means is shown in FIG. 10 where the tubular portion 5 of the connection includes a radially tapped projection 51 to receive a clamping screw 52 whose head clamps against the ring 38 and which can be screwed tight thereagainst.

It may be advantageous to provide stepdown gearing for driving the ring 38. To do this, the ring 38 may be provided with external teeth which co-operate with a gearwheel 53 rotatably mounted in bearings 54 provided in a projection 55 from the tubular portion 5. The gearwheel 53 may be operated by means of an end head 53a provided with a slot 56 suitable for receiving a screwdriver. A cover 57 may protect the gearing. It may be observed that the axis of the wheel 53 is parallel to the axis of the tubular portion 5.

FIG. 12 shows the ring 38 being driven by an endless worm-screw type configuration. To this end, the ring 38 is provided with external teeth 38a co-operating with the teeth 58a of an endless screw 58 which is pivotally mounted in bearings 59 and 60 provided on projections from the tubular portion 5 and having an axis extending transversely to the axis of said tubular portion. The screw 58 may be operated by means of a screwdriver engaged in a slot 61. In order to lock the ring 38 in position, the slopes of the teeth 38a and 58a are designed to be such that the transmission of motion is not reversible.

In the variant embodiments shown in FIGS. 3 and 6, it may be observed that the wall 23 is added to the bore 22. This disposition using separate walls makes it easier to make the orifices therethrough and also makes it possible to ensure that its face co-operates accurately against the leading front face 26a of the plug. However, in a variant embodiment, which will be more difficult to machine, a wall 23' may be provided having a function equivalent to that of the wall 23 but which is integrally formed with the body of the tubular portion 5 of the connection and which constitutes an end plate thereof. This disposition is shown in FIG. 13, with the plug being pressed against the fixed wall 23' by means of a spring 62 disposed between the stopper 11 and a transverse wall of the plug facing said stopper. Whereas the resilient non-return valve 37 shown in FIGS. 3 and 6 bears against the plug itself, since its bottom edge is received in a groove of the plug; in the FIG. 13 embodiment the resilient flange is disposed between the end of the bore 22 and the plug. It is therefore the outside edge 37a of the resilient non-return valve 37 which is held fixed relative to the plug. Finally, it can be seen in FIG. 13 that the ring 38 constitutes a complete annulus and is connected to the plug 26 by means of a peg 63.

FIG. 14 shows a variant embodiment of the device in accordance with the invention in which the wall 23 which includes orifices 24 has, facing the plug 26, a contact surface 70 which is no longer transverse, but which is conical about the axis y—y'. Thus, the orifices 31 through the plug 26 are closed to a greater or lesser extent by the wall 23 as they rotate relative thereto. The quality of the bearing, and in particular the sealing thereof, is provided by a spring 33' which may be constituted by a stack of resilient washers. The branch of the internal passage through the connection which is provided with a non-return valve is then reduced to a central opening 32' through the plug 26 whose front face constitutes the seat of a non-return valve 37' which is resiliently biased against said front face.

Figure 15:
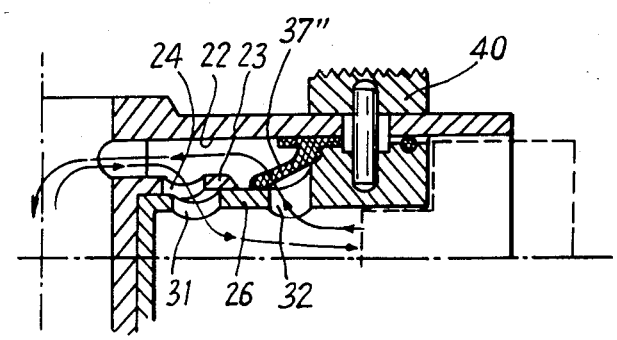

FIG. 15 shows a similarly diagrammatic representation of another variant embodiment of the invention in which contact between the wall 23 and the plug 26 takes place via a cylindrical surface 80. The orifices 24 and the openings 31 then extend radially relative to said surface 80. It may be observed in this figure that the openings 32 through the plug 26 are provided radially through a cylindrical wall thereof. The resilient non-return valve 37" is then constituted by a resilient skirt which is substantially conical in shape having an end rim received between the plug and the inside surface of the bore 22, thereby enabling it to perform the function of the sealing ring 29 described with reference to the preceding figures.

The invention is particularly applicable to pneumatic installations.

We claim:

1. An angled connection for connecting a pneumatic duct to a user apparatus, said connection comprising a first tubular fixing portion for fixing the connection to the apparatus by co-operating with an opening provided through a wall of the apparatus, and a second tubular portion perpendicular to the first and for receiving said duct, said connection including:
   an internal passage for pneumatic fluid constituted by the inter-communicating bores of said two tubular portions, said passage being divided into first and second branches;
   a constriction device of adjustable cross section being provided in said first branch;
   a non-return valve being provided in said second branch;
   the connection including the improvements whereby:
   said second tubular portion includes an end plate at its end adjacent to said first tubular portion and duct retaining means at its opposite end for retaining said duct;
   said two branches are located concentrically and in parallel inside the bore of said second tubular portion between said end plate and said duct retaining means;
   said two branches are defined:
      by means of a wall fixed in said bore and provided with first and second through orifices; and
      by means of a plug mounted free to rotate in sealed manner inside the bore about the bore axis and kept in contact one of the surfaces of said fixed wall through which said first orifices pass; said plug possessing:
      at least one first through opening uncovering said first orifices to a greater or lesser extent depending on the angular position of the plug inside the bore in order to form said constriction of adjustable cross section; and
      at least one second through opening forming, together with said second orifices, said second internal branch of the passage;
   a non-return valve co-operating with said second opening and resiliently biased against a seat constituted by one of the surfaces of the plug into which the second opening opens out; and
   means accessible from outside said second tubular portion being coupled to said plug in order to rotate said plug in said bore.

2. An angled connection according to claim 1, wherein the contact surface between the plug and the wall is perpendicular to the axis of the bore.

3. An angled connection according to claim 1, wherein the contact surface between the plug and the wall is conical and is coaxial with the bore.

4. An angled connection according to claim 1, wherein the plug and the wall are kept in contact with each other by a resilient return member.

5. An angled connection according to claim 1, wherein the contact surface between the plug and the wall is cylindrical and coaxial with the bore.

6. An angled connection according to claim 1, wherein the wall is integrally formed with the second tubular portion of the connection.

7. An angled connection according to claim 1, wherein the said wall is added into said bore and includes means for preventing it from rotating relative thereto, the resilient return means being coupled between the end plate of the bore and said add-on wall.

8. An angled connection according to claim 1, wherein the plug includes two annular sealing rings co-operating with the bore and the second tubular portion which includes a slot between said sealing rings with the operating means for rotating the plug in the bore passing through said slot.

9. An angled connection according to claim 8, wherein the operating means for driving the plug are constituted by an adjustment ring outside and coaxial with the second tubular portion, said ring being axially and angularly coupled with the plug through said slot.

10. An angled connection according to claim 9, including means for locking said ring relative to the second tubular portion.

11. An angled connection according to claim 8, wherein the operating means for driving the plug are constituted by a toothed wheel fixed axially on said second tubular portion and meshing through the slot with a ring of teeth coupled to the plug.

12. An angled connection according to claim 8, wherein the said operating means are constituted by a screw extending perpendicularly to the second tubular portion and rotatably fixed thereto, said screw co-operating with external teeth of a ring which is coupled to the plug in an endless worm screw drive arrangement, with the pitch of the teeth being non-reversible in order to lock the angular position of the plug.

13. An angled connection according to claim 1, wherein the surface through which said second opening opens out is a radial surface, with the non-return valve being constituted by a resilient annular washer having one of its edges held fixed relative to said surface.

14. An angled connection according to claim 1, wherein the surface through which said second opening opens out is a surface of rotation about the axis of the bore, with the non-return valve being constituted by a resilient sleeve of complementary shape having one of its ends held fixed relative to said surface.

* * * * *